US006214153B1

(12) United States Patent
Chess

(10) Patent No.: US 6,214,153 B1
(45) Date of Patent: Apr. 10, 2001

(54) SELF LAMINATING CLEAN RELEASE CARD

(75) Inventor: Stanley C. Chess, Goffstown, NH (US)

(73) Assignee: Moore North America, Inc., Grand Island, NY (US)

( * ) Notice: Subject to any disclaimer, the term of this patent is extended or adjusted under 35 U.S.C. 154(b) by 0 days.

(21) Appl. No.: 09/348,660

(22) Filed: Jul. 6, 1999

(51) Int. Cl.$^7$ .................................................. B32B 31/00

(52) U.S. Cl. ......................... 156/253; 283/101; 283/105; 283/109; 156/268; 156/260; 156/277

(58) Field of Search ................................ 283/67, 70, 74, 283/75, 81, 101, 105, 109; 412/1, 8, 37; 156/253, 248, 268, 289, 260, 270, 277

(56) References Cited

U.S. PATENT DOCUMENTS

| | | | |
|---|---|---|---|
| 3,069,793 | 12/1962 | Francescon . | |
| 4,928,875 | 5/1990 | Hutchinson . | |
| 4,951,970 * | 8/1990 | Burt | 283/67 |
| 4,982,894 | 1/1991 | Schmidt . | |
| 4,986,868 | 1/1991 | Schmidt . | |
| 5,172,938 | 12/1992 | Schmidt . | |
| 5,174,493 | 12/1992 | File . | |
| 5,193,850 | 3/1993 | Lombardo . | |
| 5,201,464 | 4/1993 | File . | |
| 5,253,798 | 10/1993 | Lombardo . | |
| 5,289,972 | 3/1994 | Sauerwine et al. . | |
| 5,312,136 | 5/1994 | Capozzola . | |
| 5,318,326 * | 6/1994 | Garrison | 283/101 |
| 5,320,387 | 6/1994 | Carlson . | |
| 5,362,106 | 11/1994 | Longtin . | |
| 5,427,416 * | 6/1995 | Birch | 283/109 |
| 5,509,693 | 4/1996 | Kohls . | |
| 5,518,787 | 5/1996 | Konkol . | |
| 5,529,345 | 6/1996 | Kohls . | |
| 5,589,025 | 12/1996 | Garrison . | |
| 5,662,976 | 9/1997 | Popat et al. . | |
| 5,736,212 | 4/1998 | Fischer . | |
| 5,829,670 | 11/1998 | Lombardo et al. . | |
| 5,840,143 | 11/1998 | Swanson . | |
| 5,916,665 | 6/1999 | Fischer et al. . | |
| 6,027,597 * | 2/2000 | Main | 156/253 |

* cited by examiner

*Primary Examiner*—Willmon Fridie, Jr.
(74) *Attorney, Agent, or Firm*—Nixon & Vanderhye PC

(57) ABSTRACT

A business form, from which a laminated card may be formed, is produced by spot coating silicone-release material on the back of the web or sheet which forms the business form, covering slightly more than a card-sized area, and then applying a clean release material to the back of the web or sheet covering the coating of silicone release material and another area from which a card may be die cut. The back may be imaged before application of the clean release material, and the face of the laminated card to be formed is imaged with variable (and perhaps non-variable) indicia, e.g., by a laser printer. The clean release material is die cut through the adhesive and clear plastic layers, but not the baseliner. To form the laminated card, the second card is removed, exposing the pressure sensitive adhesive of the clean release material underlying it, the first card is folded over to release from the baseliner underlying it and to bring its imaged face into contact with the exposed adhesive, and the laminated front and back first card is peeled away from the baseliner that underlied the second card.

20 Claims, 5 Drawing Sheets

SELF LAMINATING CLEAN RELEASE CARD

BACKGROUND AND SUMMARY OF THE INVENTION

Laminated cards are becoming increasing popular in modern times, being used for identification, club or group memberships, parking passes, luggage or container tags, and for a wide variety of other uses. Many other organizations mail out business forms containing such cards either already laminated, or laminated at least in part by the recipient, and there is an ever-increasing market for business form intermediates that can be laser printed to incorporate variable information or indicia before the form is folded into a mailer-type business form, sealed and mailed to the recipient for production of the final laminated card. Exemplary prior art techniques in this regard are disclosed in U.S. Pat. Nos. 5,427,416, 5,662,976, 5,362,106 and 5,172,938. Laminated cards are highly desirable because it is important to keep the toner imaged on the cards so that it will not be easily rubbed off. Impact printers usually must use a heavy inked ribbon for a good, dark toner image on paper-faced cards. Laser printers use heat and pressure to adhere the toner to the sheet, and toner anchorage varies due to thickness of the stock, how fast the printer operates, how hot the fuser roller is, what type of toner is used, and what substrate it is printed on.

According to the present invention a method of producing, and ultimately handling, a business form from which a laminated two-faced card can be produced, a card so produced, and a business form containing such a card, are provided which have numerous advantages over the prior art. The business form produced and utilized to make a card according to the invention is significantly simpler than a number of the prior art procedures and constructions. The invention has enhanced versatility and simplified construction procedures compared to a German card construction which utilizes dummy and active cards and clean release material, but applies a patch of release liner material adhered by adhesive to the back of the dummy card portion of the business form with the silicone side out. In such a construction the use of liner material can make the form difficult to handle because of uneven thickness passing through a laser printer or the like, and typically is more costly than desired.

According to one aspect of the present invention, there is provided a method of producing, and ultimately handling, a business form using a web or sheet of imagable material having a face and a back, and a clean release material having as consecutive layers a pressure-sensitive adhesive, a transparent plastic, a dry release material, and a baseliner. The method comprises: (a) Spot coating silicone release material on the back of the web or sheet in a first area significantly less than the area of a business form to be formed. (b) Applying the clean release material to the back of the web or sheet in a second area, larger than the first area, and over and encompassing at least a significant amount of the first area, so that the adhesive adheres to the back of the web or sheet. (c) Imaging variable indicia on at least part of the face of the web or sheet opposite the second area on the back of the web or sheet, forming a third, imaged, area. And, (d) die cutting the web or sheet from the face thereof to form first and second generally equally sized adjacent cards, a first imaged face card having the third, imaged, area thereon and having a fourth area smaller than about one-half the second area, and a second card including at least part of the first area, and having a fifth area also smaller than about one-half the second area, the die cutting extending substantially completely through the adhesive and transparent plastic of the clean release material, but not the baseliner, and the die cutting including a substantially common die cut between the first and second cards along an edge of each.

The method also typically further comprises before (b) (and also typically before (a)) imaging the back of the web or sheet at at least a portion thereof opposite the third area to provide non-variable indicia thereon. While (c) and (d) may be practiced in either order, oftentimes (d) is practiced before (c). In the method (c) may be practiced before or after (a). Typically, the web or sheet comprises a sheet defining a business form, or a web, and if a web the method further comprises forming the web into a plurality of business forms, each individual form having (a) through (d) practiced. The method further comprises after (a) through (d), folding and sealing the business form to produce a mailer type business form with the faces of the cards unexposed, and mailing the mailer type business form.

Typically, (b) is practiced to apply the clean release material so that it substantially completely encompasses the first area. While other materials can be used, typically the web or sheet is a porous material like paper, and depending upon the details thereof and the nature of the silicone coating the method may further comprise applying a barrier coat to the first area before practicing (a).

The method typically further comprises (e) forming a dual face laminated card from the business form by sequentially: (e1) Removing the second card from the business form, exposing the pressure-sensitive adhesive underlying it. (e2) Folding over the first card so that the face thereof comes into contact with the adhesive exposed by (e1) and so that the transparent plastic of the clean release material underlying the first card dry releases from the baseliner. And, (e3) peeling the first card, with transparent plastic covering both the face and back thereof, away from the baseliner underlying the second card so that the first card dry releases from the baseliner underlying the second card.

The method may further comprise after (a)–(d), and before (e), folding and sealing the business form to produce a mailer-type business form with the faces of the cards unexposed, mailing the mailer-type business form, and opening up the mailer-type business form to expose the faces of the first and second cards.

Since the second card will more easily release from the clean release material, because of the silicone coating thereon, it is desirable to provide substantial ties between the surrounding business form and the second card. Typically, (d) is practiced to leave either no ties or first ties between the first card and the rest of the web or sheet, and to leave second ties, which are more secure than the first ties, between the second card and the rest of the web or sheet.

According to another aspect of the present invention, a business form is provided comprising: A substantially quadrate sheet of imagable material (preferably paper, but also films or plastic and the like that can effectively be imaged, particularly with a laser printer) having a face and a back. First and second immediately adjacent substantially quadrate cards die cut from the sheet and having a substantially common edge. The second card back having a coating of silicone release material. The first card back and the second card coating of silicone release material substantially completely covered with a clean release material having as consecutive layers a pressure-sensitive adhesive engaging the first card back and the second card silicone release coating, a transparent plastic, a dry release material, and a baseliner. The die cuts of the first and second card, defining at least all edges except the common edge, passing through the adhesive and the transparent plastic layers of the clean release material.

The business form may further comprise indicia imaged on the first card (e.g. variably imaged indicia by a laser printer), and imaged indicia (such as non-variable indicia) imaged on the back of the first card. The sheet may comprise a mailer type business form, folded about at least one fold line and sealed to provide the first card face interior of the mailer type business form.

The business form may further comprise either no ties or first ties between the first card and the rest of the sheet, and second ties, which are more secure than the first ties, between the second card and the rest of the sheet. Typically when the sheet is paper or a like porous material, and where the silicone coating is UV curable silicone, the form may further comprise a barrier coat between the silicone coating and the back of the paper sheet to prevent the silicone coating from soaking into the paper sheet.

According to yet another aspect of the present invention there is provided: A laminated card having a face and a back and imaged indicia on at least the face, and a plastic layer covering both the face and back and adhesively secured thereto, the card formed by a method using a web or sheet of imagable material having a face and a back, and a clean release material having as consecutive layers a pressure sensitive adhesive, a transparent plastic, a dry release material, and a baseliner, comprising: (a) Spot coating silicone release material on the back of the web or sheet in a first area significantly less than the area of a business form to be formed. (b) Applying the clean release material to the back of the web in a second area, larger than the first area, and over and encompassing at least a significant amount of the first area, so that the adhesive adheres to the back of the web or sheet. Then, (c) imaging variable indicia on at least part of the face of the web or sheet opposite the second area on the back of the web or sheet, forming a third, imaged, area. (d) Die cutting the web or sheet from the face thereof to form first and second generally equally sized adjacent cards, a first imaged face card having the third, imaged, area thereon and having a fourth area smaller than about one-half the second area, and a second card including at least part of the first area, and having a fifth area also smaller than about one-half the second area, the die cutting extending substantially completely through the adhesive and transparent plastic of the clean release material, but not the baseliner, and the die cutting including a substantially common die cut between the first and second cards along an edge of each. Wherein the web or sheet comprises a sheet defining a business form, or a web, and if a web further comprising forming the web into a plurality of business forms, each individual form having had (a)–(d) practiced thereon. And, (e) forming the laminated card from the business form by sequentially: (e1) removing the second card from the business form, exposing the pressure sensitive adhesive underlying it; (e2) folding over the first card so that the face thereof comes into contact with the adhesive exposed by (e1) and so that the transparent plastic of the clean release material underlying the first card dry releases from the baseliner; and (e3) peeling the first card, with transparent plastic covering both the face and back thereof, away from the baseliner underlying the second card so that the first card dry releases from the baseliner underlying the second card.

It is the primary object of the present invention to provide for the simple, very effective, and versatile production of business forms that can be made into laminated cards, and the laminated cards so produced. This and other objects of the invention will become clear from an inspection of the detailed description of the invention and from the appended claims.

DETAILED DESCRIPTION OF THE DRAWINGS

FIGS. 1–4 are schematic side views of various business forms. In each case all of the various layers of the business form are highly exaggerated in both actual and relative size in order to illustrate the invention. Those of ordinary skill in the art will understand that all of the layers or coatings have a much smaller thickness than schematically illustrated in FIGS. 1 through 4, and the relative thicknesses between them vary vastly.

Figure 1:
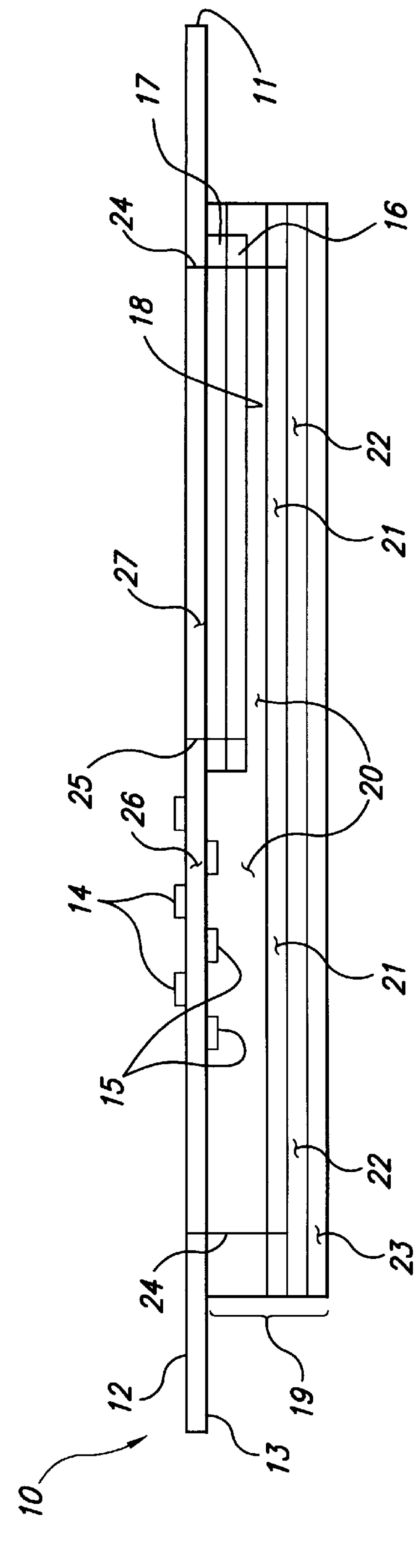
Fig. 1 (PRIOR ART)
FIG. 1 is a side schematic view of an exemplary prior art construction of a business form that may be made into a laminated card, over which the invention is an improvement.

FIG. 1 schematically illustrates a prior art construction of a non-mailer type business form shown generally by reference numeral 10, and including sheet of paper 11, a face 12, and a back 13. The face 12 is imaged, the imaged indicia illustrated schematically at 14, as is the back 13, indicia thereon shown schematically at 15.

The form 10 includes a patch 16 of liner material secured by permanent adhesive 17 to the back 13 of the sheet 11 at a first area thereof, the silicone side 18 of the liner material 16 facing outwardly away from the back 13 of sheet 11. The liner 16 is relatively thick, such that it can potentially cause processing problems, and provides more material than is desired.

The form 10 also includes a conventional clean release material 19 having as consecutive layers a permanent pressure sensitive adhesive 20, a transparent plastic 21, a dry release material 22, and a baseliner 23. Typically the clean release material 19 is sold with a throw away liner (with a silicone face) over the pressure sensitive adhesive 20 so as to protect it, but that silicone liner is peeled away and discarded before the pressure sensitive adhesive 20 is brought into contact with the face 13 overlying both the liner 16, and adjacent areas, therefore the throw away liner is not illustrated in FIG. 1. The form 10 further comprises die cuts 24 and 25, which separate the sheet 11 into a first card 26, and a second card 27. At least the die cuts 24 penetrate both of the layers 20, 21, but do not sever the baseliner 23.

In use of the prior art form 10 of FIG. 1, the recipient peels the second card 27 away from the adhesive 20. The second card 27 will relatively easily release from the adhesive 20 because of the liner 16 with silicone face 18 engaging the adhesive 20. The card 27 is discarded or, if it has relevant indicia thereon, may be kept separately. When the second card 27 is peeled away from the rest of the form 10, it exposes the pressure sensitive adhesive 20 that underlied it. One then peels the first card 26 away from the baseliner 23. Because of the die cut 24, and the dry release material 22, the card 26 with attached adhesive 20 and transparent plastic 21 covering the back 13 of the card 26, will peel away from the baseliner 23, and the face 12 of the card 26 is brought into contact with the adhesive 20 formerly underlying the second card 27. Then the first card 26, now laminated on the face 12 by the transparent plastic 21 that was peeled away from the dry release material 22 formerly underlying the second card 27, and on back 13 by the transparent plastic 21 formerly underlying the card 26.

Figure 2:
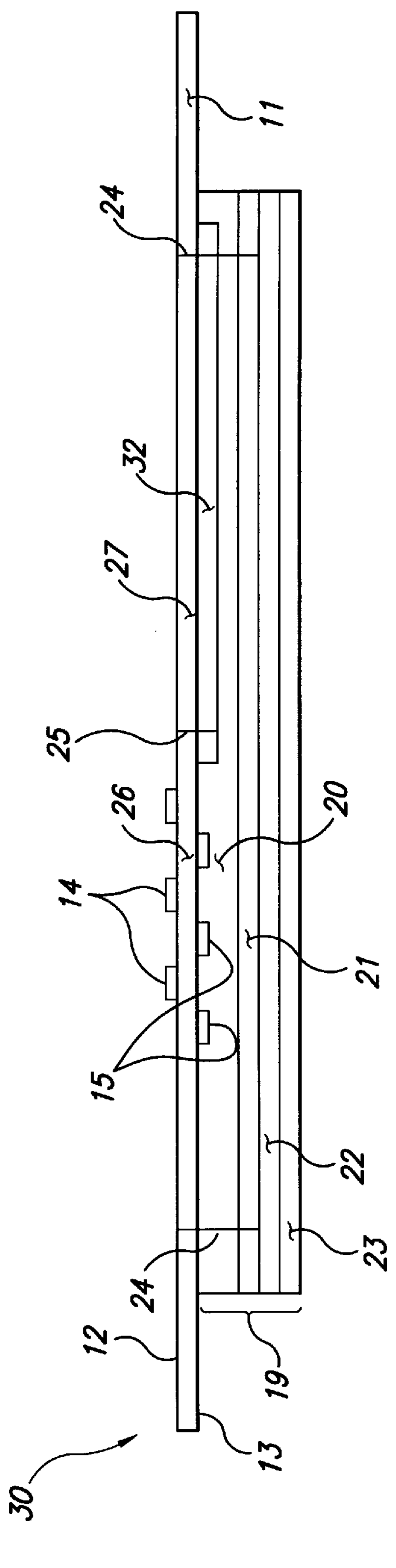
FIG. 2 is a view like that of FIG. 1 of an exemplary form according to the invention.
Figure 3:
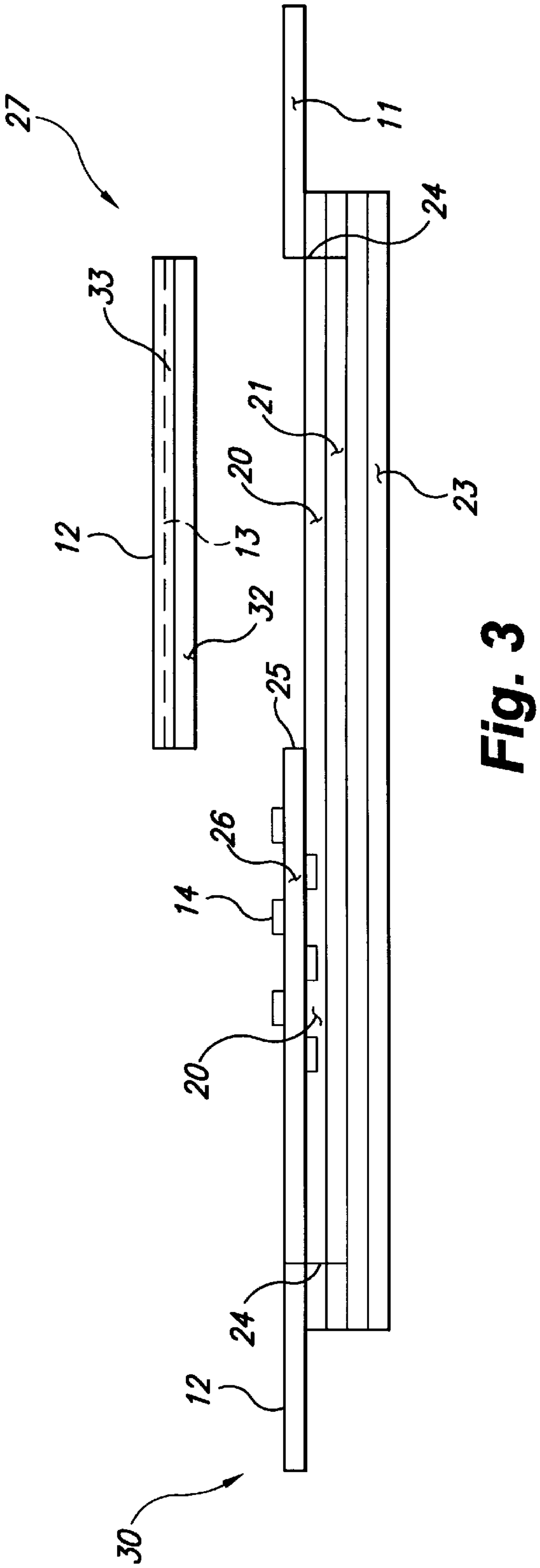
FIG. 3 is a view like that of FIG. 2 but showing the second, "dummy" card being removed.
Figure 4:
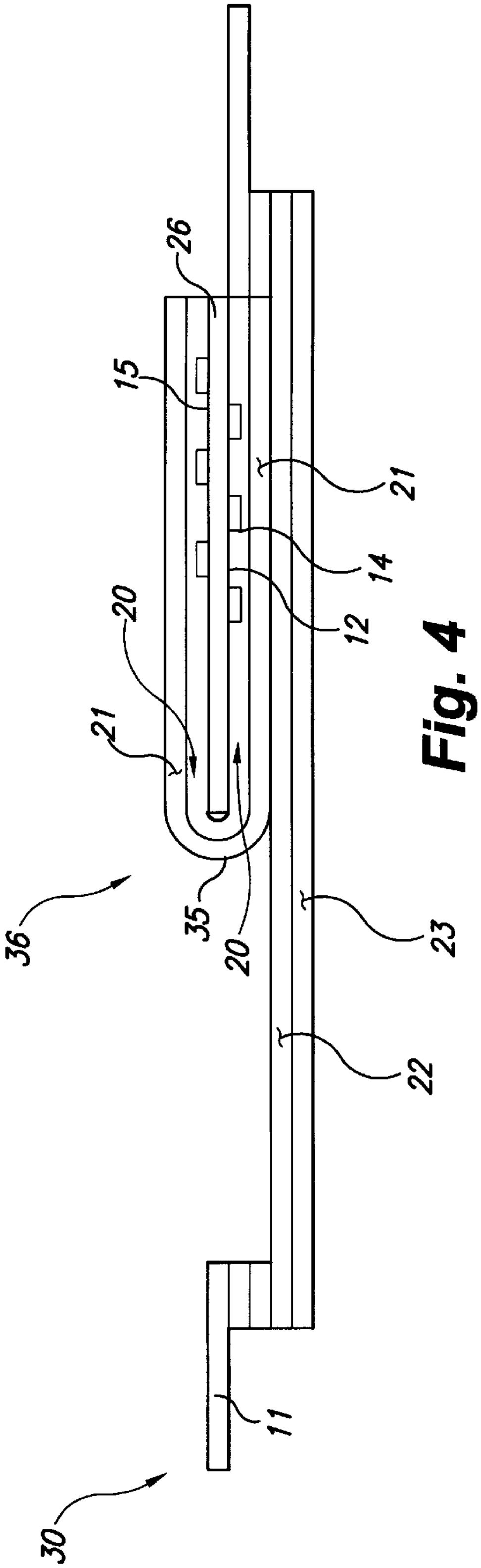
FIG. 4 is a view like that of FIGS. 2 and 3 only showing the first, active, card being folded over to form a laminated card.

FIGS. 2 through 4 illustrate a consecutive procedure in the production of a form 30 according to the invention that provides an improvement over that of FIG. 1. The form 30 according to the present invention uses the same reference numerals as the form for comparable parts. The form 30 preferably is a mailer type business form as will be hereinafter described.

Although there are other differences in the specifics of the materials, one basic difference between forms 10 and 30 is what is provided on the back 13 of the forms 10 and 30. According to the invention, a silicone coating 32 is applied to the back 13 at the area of the second card 27, preferably covering substantially the entire back 13 of the card 27 and a small amount on each side (e.g. one-sixteenth to one and one-eighth inches around the die cuts 24, 25). If the sheet 11 is of a porous material, such as most papers, in order to prevent the silicone release material 32 from soaking into the sheet 11, a barrier coat (such as a conventional varnish) may be applied to the back 13 of the sheet 11 at the area of the second card 27. For clarity of illustration the barrier coat is not illustrated in FIG. 2 but is shown schematically at dotted line at 33 in FIG. 3. The construction of FIG. 2 provides less variation in the thickness of the form 30 compared to the form 10 and is normally simpler and easier to execute, especially where the silicone release coating 32 is a conventional UV curable silicone release coating, such as available from General Electric or Goldschmidt, and less expensive.

FIG. 3 shows the form 30 with the second, dummy, card 27 removed and with the pressure sensitive adhesive 20 formerly underlying it exposed. FIG. 4 shows the first, active, card 26 folded over so that the face 12 thereof engages the adhesive 20 formerly underlying the card 27, and thus adhering the transparent plastic 21 which previously underlied the card 27 to the face 12 of the card 26 to protect the indicia 14. In the embodiment illustrated in FIGS. 2 through 4 the die cut 25 between the cards 26, 27 only penetrated the card 27 and the silicone coating 32, and perhaps the adhesive layer 20, but did not sever the transparent plastic 21 so that portion 35 of that plastic 21 (see FIG. 4) surrounds the edge of the card 26 formed by the die cut 25, that was substantially in common with the edge of the card 27 formed by the die cut 25 when the cards 26, 27 were immediately adjacent each other. But die cut 25 can penetrate the same as die cut 24.

It is understood that although the cards 26, 27 are shown in a side-by-side configuration in FIGS. 2 through 4 that they equally well could be one above the other.

Figure 5:
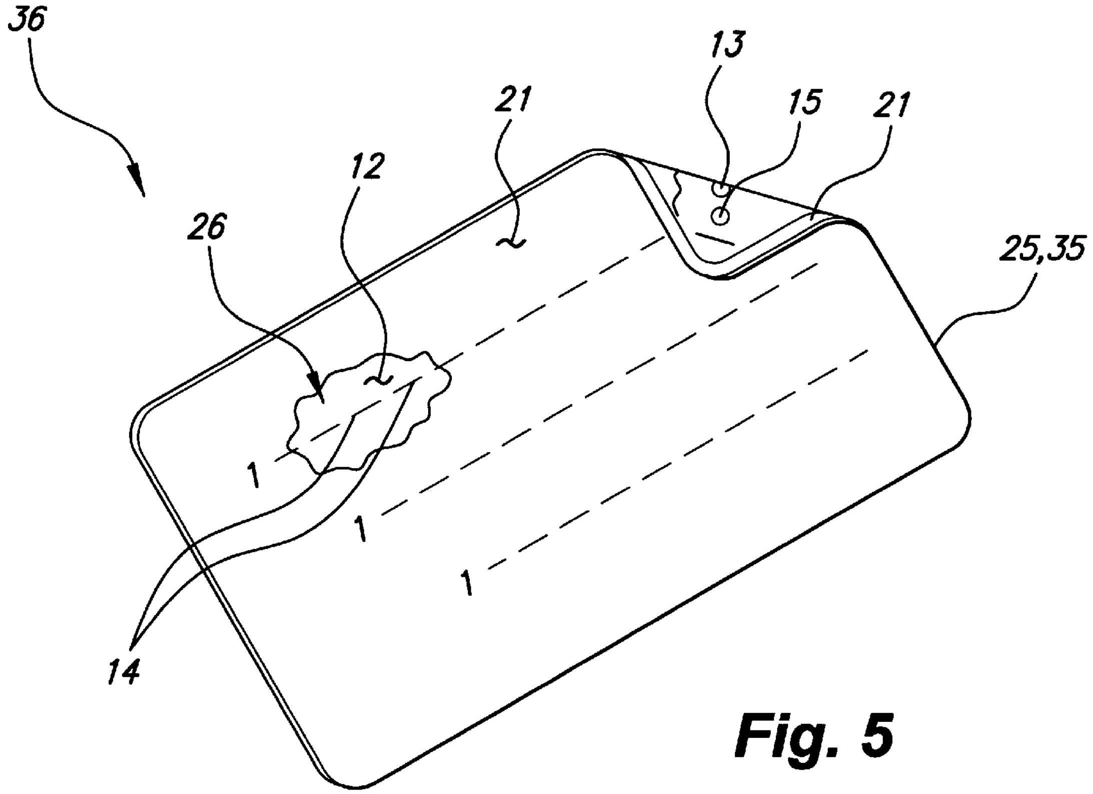
FIG. 5 is a perspective view of the laminated card produced from FIG. 4 after the separation thereof from the rest of the business form.

FIG. 5 illustrates an exemplary laminated card 36 which is formed according to the invention. The face 12 having the indicia 14 is covered by the plastic layer 21 formerly underlying the card 27, while the back face 13 having indicia 15 thereon is protected by the plastic layer 21 previously underlying card 26 when in the form 30.

Figure 7:
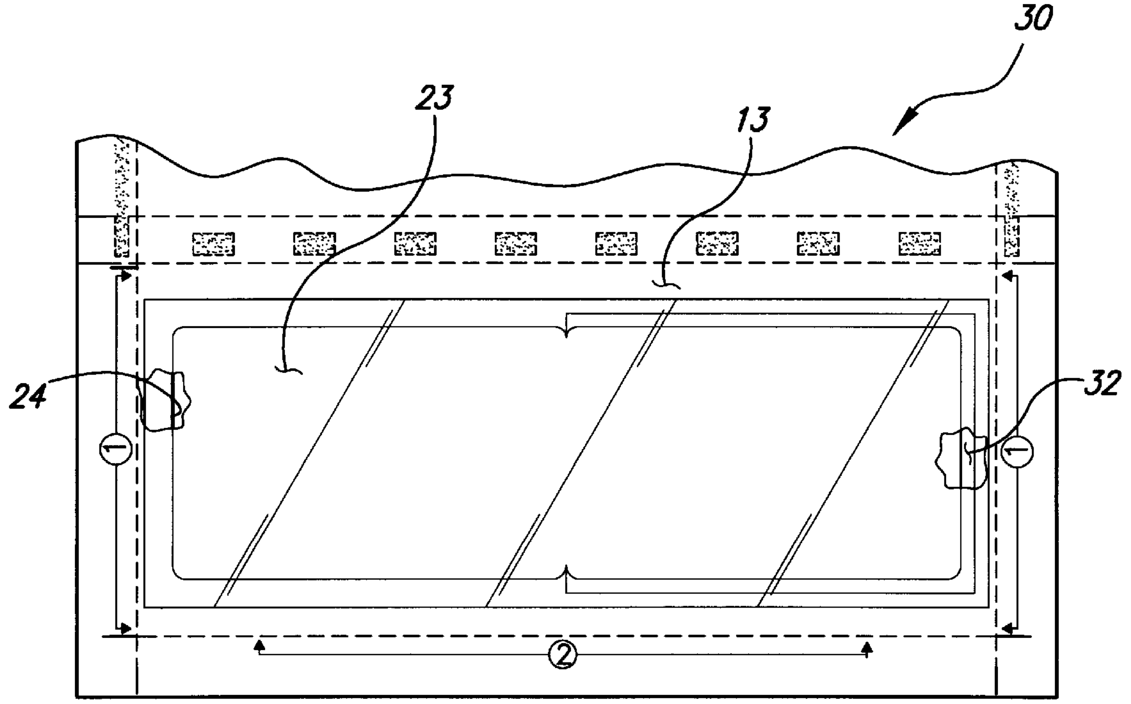
FIG. 7 is a detail view of the other side of the bottom of the form as viewed in FIG. 6.
Figure 6:
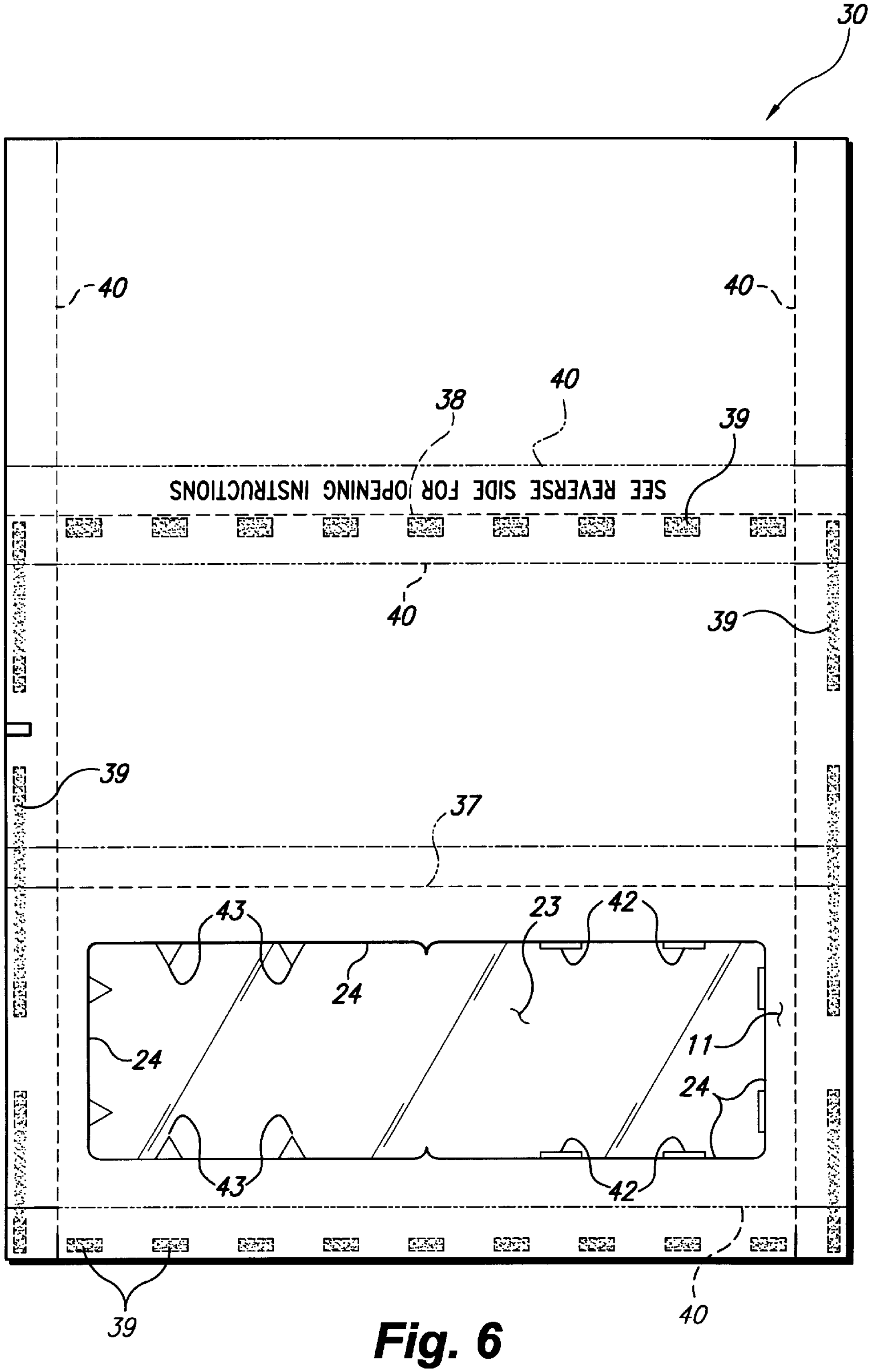
FIG. 6 is a top plan view of a business form according to the invention only with the first and second cards removed therefrom.

FIGS. 6 and 7 schematically illustrate the form 30 as a mailer. In this case the form 30 comprises a Z-fold mailer with pressure activated cohesive, such as shown in U.S. Pat. No. 5,829,670 (the disclosure of which is hereby incorporated by reference herein) except that the patent does not have the clean release material 19, or the like. FIGS. 6 and 7 show the cards 26, 27 after removal from the form 30. However it is to be understood that during normal usage of the form 30 as a mailer type business form, the cards 26, 27 will not be removed until after it has been folded about fold lines 37, 38 and sealed with the pressure sensitive cohesive patterns 39 and then detached along the lines of weakness 40.

The materials used in the construction of the form 30 may be a wide variety of different types of materials. For example the variable indicia 14 (non-variable indicia may also be provided on the face 12) and the non-variable indicia 15 may be of any suitable material such as laser printer toner, ink from an impact ribbon, or the like, and may include color indicia and/or photographic images. The clean release material 19 is conventionally available from a wide variety of sources such as Precision Coated Products from Batavia, Ill. One particularly desirable source of clean release material is two mil "Lite Lift Dry", which has a forty pound throw away silicone liner, permanent pressure sensitive adhesive 20, a two mil transparent polyester layer 21, pattern dry release material 22, and a twenty-eight pound white baseliner 23. The same construction with a five mil poly-laminate layer 21 is also available, and the baseliner 23 may be black opaque instead of white translucent. Alternatively for the "SE Thin Lift Dry" product from Precision Coating Products, the layer 24 may be three-quarter mil poly-film, and the baseliner 23 may be one mil clear PET. Other constructions are also available.

The second card 27 does not adhere as well to the surrounding sheet 11 as does the card 26, therefore according to the invention (and distinct from the prior art construction of FIG. 1) the card 27 has the die cuts 24 forming it constructed so that significant ties are provided. This is schematically illustrated by the ties 42 in FIG. 6, which are wide enough (depending upon the nature of the pressure sensitive permanent adhesive 20, and other variables) to ensure that the card 27 will remain in place but still can be readily detached by the ultimate user. For the card 26, on the other hand, the ties 43 (schematically shown in FIG. 6) are provided which are less secure (e.g. by about 25%) than are the ties 42. This is because the attraction between the plastic 21 and the release material 22—while still allowing ready release—is more secure than the attraction between the silicone 32 and the adhesive 20.

FIG. 7 shows the back of the lower panel of the form 30 of FIG. 6 showing that in the preferred embodiment the material 19 (just the portion 23 thereof) occupies a wider area at the back of the form 30, overlapping the area defined by the cut outs 24 for the cards 26, 27, even greater than for the silicone coating 32.

Figure 8:
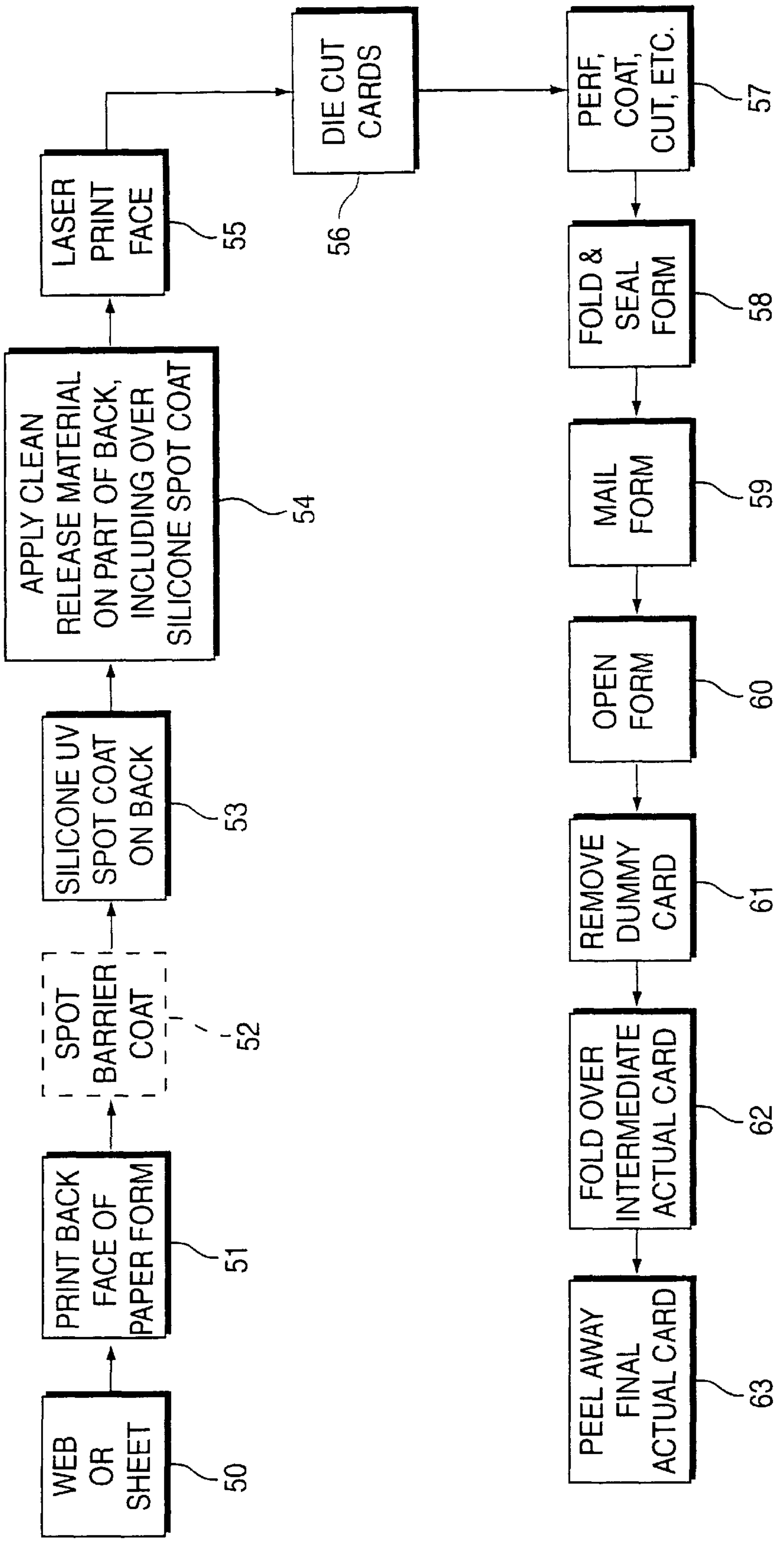
FIG. 8 is a box diagram schematically illustrating the practice of an exemplary method according to the present invention.

FIG. 8 illustrates in box format an exemplary method according to the present invention. All of the equipment used in the practice of the method is conventional equipment, making the practice thereof simple and relatively convenient and inexpensive.

Transported by conventional transporting apparatus (such as rollers, tractor drives, etc.) a web or sheet from source 50 is fed to a station 51 where preferably, although not necessarily, non-variable indicia is printed or otherwise imaged on the back 13 of the form 30, at least in the area of the card 26 which will be formed therefrom. Especially where the web or sheet from 50 is paper or a like porous material, optional procedure 52 can be practiced wherein a conventional barrier coat (such as varnish), such as illustrated schematically at 33 in FIG. 3, may be applied to the back 13 of the web or sheet in the area where the silicone coating 32 will ultimately be applied and from which the card 27 will be die cut. Then the web or sheet from 50 passes to the station 53 where the spot coat 32 of UV silicone or the like is applied over the barrier coat applied at 52 (if present), and over a slightly larger area on the back 13 of the web or sheet from 50 than the area of the card 27 which will be formed.

The web or sheet then passes to the next station 54 where the clean release material 19 is applied. This is accomplished, for example, in a continuous manner, by conventional equipment removing the throw away liner from a roll of material 19 to expose the adhesive 20, placing the adhesive 20 over the area of the back 13 of the web or sheet as schematically illustrated in FIG. 7, and then cutting off the material 19, so that the layers of the material 19 have the form illustrated in FIG. 2.

After the station 54 the variable indicia 14 may be imaged on the face 12, as by conventional laser print station 55. Indicia 14 is applied at least over the area where card 26 is to be provided, but also over any other areas of the face 12 of the web or sheet that are desired to be variably (or non-variably) imaged. As illustrated at 56 in FIG. 8, the web or sheet is die cut using conventional die cutting equipment so as to penetrate the material 11 forming the substrate of the web or sheet, and the layers 20 and 21 and the coating 32, but not severing the baseliner 23 (see FIGS. 2 through 4 for the die cuts 24, 25). The die cut equipment in 56 is also constructed and adjusted so as to provide the secure ties 42 and, if desirable, the less secure ties 43 (see FIG. 6).

While FIG. 8 shows the station 55 before the station 56, their order can be reversed. Station 55 also can be before or after station 51.

Were the business form to be produced from the web or sheet from 50 is a mailer, such as the mailer 30, various other operations are performed such as applying fold and/or perf lines 37, 38, 40, applying cohesive strips or other patterns 39, etc., as is conventional. This is all illustrated schematically at 57 in FIG. 8, but it is to be understood that the station 57 may be almost anywhere in the process prior to the fold and seal station 58, and various functions performed at station 57 may be interspersed throughout the method.

The mailer 30 is Z-folded, C-folded, V-folded, or otherwise folded, and heat or pressure, or the like, is applied (depending upon the type of cohesive or adhesive 39 utilized). The procedure at station 58 preferably is practiced so that the face 12 of the cards 26, 27 is inside the mailer (that is the form 30 is folded as illustrated in FIG. 6 so that the middle panel overlies the bottom panel as seen in FIG. 6). If the material being acted upon is a web, then at station 57 the web is cut into a business form such as illustrated at 30, in fact into a plurality of business forms.

After folding and sealing at 58 the mailer type business form 30 is mailed (by the U.S. Postal Service, or a courier service, etc.). When the recipient gets it he or she—as illustrated schematically at 60 in FIG. 8—tears along the perf lines 40 to open up the form 30 and to expose the face 12 of the cards 26, 27. Then the dummy card 27 is removed as indicated at 61, and as also illustrated schematically in FIG. 3. The first card 26 (such as an ID card, membership card, parking pass, driver's license, etc.) is folded over—as illustrated at station 62 in FIG. 8 and as illustrated in FIG. 4. Finally—as illustrated schematically at 63 in FIG. 8, one peels the final card 36 away from the dry release material 22 which formerly underlaid the second card 27, and the final laminated card 36 is provided.

While the invention has been herein shown and described in what presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent products and methods.

What is claimed is:

1. A method of producing, and ultimately handling, a business form using a web or sheet of imagable material having a face and a back, and a clean release material having as consecutive layers a pressure-sensitive adhesive, a transparent plastic, a dry release material, and a baseliner, comprising:

(a) spot coating silicone release material on the back of the web or sheet in a first area significantly less than the area of a business form to be formed;

(b) applying the clean release material to the back of the web or sheet in a second area, larger than the first area, and over and encompassing at least a significant amount of the first area, so that the adhesive adheres to the back of the web or sheet; then (c) imaging variable indicia on at least part of the face of the web or sheet opposite the second area on the back of the web or sheet, forming a third, imaged, area; and (d) die cutting the web or sheet from the face thereof to form first and second generally equally sized adjacent cards, a first imaged face card having the third, imaged, area thereon and having a fourth area smaller than about one-half the second area, and a second card including at least part of the first area, and having a fifth area also smaller than about one-half the second area, the die cutting extending substantially completely through the adhesive and transparent plastic of the clean release material, but not the baseliner, and the die cutting including a substantially common die cut between the first and second cards along an edge of each.

2. A method as recited in claim 1 further comprising, before (b), imaging the back of the web or sheet at least at a portion thereof opposite the third area.

3. A method as recited in claim 2 wherein (d) is practiced before (c).

4. A method as recited in claim 1 wherein the web or sheet comprises a sheet defining a business form, or a web, and if a web further comprising forming the web into a plurality of business forms, each individual form having had (a)–(d) practiced thereon.

5. A method as recited in claim 4 further comprising, after (a)–(d), folding and sealing the business form to produce a mailer type business form with the faces of the cards unexposed, and mailing the mailer type business form.

6. A method as recited in claim 1 wherein (b) is practiced by applying the clean release material so that it substantially completely encompasses the first area.

7. A method as recited in claim 1 wherein the web or sheet is a porous material, and further comprising (e) applying a barrier coat to the first area before practicing (a).

8. A method as recited in claim 7 wherein (a)–(e) are practiced using a paper web or sheet.

9. A method as recited in claim 3 further comprising (e) forming a dual face laminated card from the business form by sequentially: (e1) removing the second card from the business form, exposing the pressure-sensitive adhesive underlying it; (e2) folding over the first card so that the face thereof comes into contact with the adhesive exposed by (e1) and so that the transparent plastic of the clean release material underlying the first card dry releases from the baseliner; and (e3) peeling the first card, with transparent plastic covering both the face and back thereof, away from the baseliner underlying the second card so that the first card dry releases from the baseliner underlying the second card.

10. A method as recited in claim 9 further comprising, before (b), imaging the back of the web or sheet at least at a portion thereof opposite the third area.

11. A method as recited in claim 10 further comprising, after (a)–(d), and before (e), folding and sealing the business form to produce a mailer type business form with the faces of the cards unexposed, mailing the mailer type business form, and opening up the mailer type business form to expose the faces of the first and second cards.

12. A method as recited in claim 5 wherein (d) is practiced to leave either no ties or first ties between the first card and the rest of the web or sheet, and to leave second ties, which are more secure than the first ties, between the second card and the rest of the web or sheet.

13. A method as recited in claim 1 wherein (d) is practiced to leave either no ties or first ties between the first card and the rest of the web or sheet, and to leave second ties, which are more secure than the first ties, between the second card and the rest of the web or sheet.

14. A method as recited in claim 1 wherein (c) is practiced before (a).

15. A method as recited in claim 1 further comprising (e) forming a dual face laminated card from the business form by sequentially: (e1) removing the second card from the business form, exposing the pressure-sensitive adhesive underlying it; (e2) folding over the first card so that the face thereof comes into contact with the adhesive exposed by (e1) and so that the transparent plastic of the clean release material underlying the first card dry releases from the baseliner; and (e3) peeling the first card, with transparent plastic covering both the face and back thereof, away from the baseliner underlying the second card so that the first card dry releases from the baseliner underlying the second card.

16. A method as recited in claim 15 further comprising, before (b), imaging the back of the web or sheet at least at a portion thereof opposite the third area.

17. A method as recited in claim 16 further comprising, after (a)–(d), and before (e), folding and sealing the business form to produce a mailer type business form with the faces of the cards unexposed, mailing the mailer type business form, and opening up the mailer type business form to expose the faces of the first and second cards.

18. A method as recited in claim 3 wherein (c) is practiced before (a).

19. A method as recited in claim 15 wherein the web or sheet comprises a sheet defining a business form, or a web, and if a web further comprising forming the web into a plurality of business forms, each individual form having had (a)–(e) practiced thereon.

20. A method as recited in claim 19 further comprising, after (a)–(e), folding and sealing the business form to produce a mailer type business form with the faces of the cards unexposed, and mailing the mailer type business form.

* * * * *